United States Patent [19]

Waclawsky et al.

[11] Patent Number: 5,657,315
[45] Date of Patent: Aug. 12, 1997

[54] SYSTEM AND METHOD FOR RING LATENCY MEASUREMENT AND CORRECTION

[75] Inventors: John G. Waclawsky, Frederick, Md.; Paul C. Hershey, Manassas, Va.

[73] Assignee: International Business Machines Corporation, Armonk, N.Y.

[21] Appl. No.: 456,821

[22] Filed: Jun. 1, 1995

[51] Int. Cl.$^6$ .................................................... H04J 3/00
[52] U.S. Cl. .......................... 370/452; 370/252; 370/460; 370/516
[58] Field of Search ......................... 370/85.5, 85.1, 370/85.4, 85.12, 85.15, 17, 100.1, 105.3, 362, 252, 405, 451, 452, 460, 503, 516, 517, 518, 519

[56] References Cited

U.S. PATENT DOCUMENTS

| | | | |
|---|---|---|---|
| 4,663,748 | 5/1987 | Karbowiak et al. | 370/89 |
| 5,097,469 | 3/1992 | Douglas | 370/85.5 |
| 5,206,857 | 4/1993 | Farleigh | 370/85.5 |
| 5,235,893 | 8/1993 | Grow et al. | 370/855 |
| 5,247,626 | 9/1993 | Firoozmand | 395/250 |
| 5,309,428 | 5/1994 | Copley et al. | 370/17 |
| 5,313,466 | 5/1994 | Zhao et al. | 370/85.4 |
| 5,365,514 | 11/1994 | Hershey et al. | 370/85.5 |
| 5,400,331 | 3/1995 | Lucak et al. | 370/85.1 |

OTHER PUBLICATIONS

IEEE Std 802.5–1985 "Token Ring Access Method and Physical Layer Specifications" New York, 1985.
IBM Technical Disclosure Bulletin, vol. 37, No. 2A, Feb. 1994, pp. 349–350, "Determination of Bandwidth & Latency in a Multimedia Communication Enviroment".
IBM Technical Disclosure Bulletin, vol. 32, No. 11, Apr. 1990, p. 262, "Method of Measuring the Latency of a Token–Ring With Microcode".

*Primary Examiner*—Douglas W. Olms
*Assistant Examiner*—Shick Hom
*Attorney, Agent, or Firm*—Joseph C. Redmond; John D. Flynn

[57] ABSTRACT

A system and method for passively measuring and correcting ring latency on a token or FDDI ring includes generating bits and token frames in a defined pattern according to the token ring protocol. A passive device coupled to the token ring measures CMIN, the minimum spacing, CMAX, the maximum spacing in bits and calculates Fi the frequency of changes in Cmin and Cmax between successive tokens or a token and a frame on the ring. A latency event vector Li is generated by the passive device. A controller responsive to the latency vector Li corrects the spacing between successive tokens or a token and frame to achieve a constant ring latency regardless of electrical or operational changes on the token ring.

14 Claims, 4 Drawing Sheets

CONTROL FUNCTION PROCESS

STEP1   IF LATENCY BETWEEN TWO TOKENS OR A TOKEN AND THE NEXT FRAME INCREASES THEN REDUCE BITS STORED IN LATENCY BUFFER (-)

STEP2   IF LATENCY BETWEEN TWO TOKENS OR A TOKEN AND THE NEXT FRAME DECREASES THEN INCREASE THE BITS STORED IN THE LATENCY BUFFER (+)
WHEN LATENCY CHANGES OUTPUT A CONTROL SIGNAL THAT IS USEABLE BY ALL STATIONS ON THE MEDIA TO ADJUST TRANSMISSION PRIORITY

STEP3   WHEN NEXT TOKEN IS SEEN GO TO STEP1

SYSTEM AND METHOD FOR RING LATENCY MEASUREMENT AND CORRECTION

BACKGROUND OF THE INVENTION

1. Field of the Invention

This invention relates to a data transmission network. More particularly, the invention relates to measuring and correcting a token ring for ring latency.

2. Description of the Prior Art

In token rings, "ring latency" is defined as the time required for a token to circulate on the ring when the network is idle. It is important that a network have the capability of measuring ring latency as ring latency changes each time the token circulates the ring. The frequency and amplitude of the change in latency is called "jitter". Typically, the reason "jitter" occurs is due to synchronization or clock problems, hardware problems, too long a wire in between adjacent station, etc. It is important to measure "jitter" to permit a monitoring station on the token ring to compensate for it by putting extra bits on the ring or taking bits off the ring. By measuring latency for each token circulating the ring, a prediction can be made as to whether or not latency is increasing or decreasing. If latency is increasing, it will cause performance problems or even bring down the network. Knowing this condition is increasing will allow the time to find out what is causing the problem and return the ring to the normal state before a failure occurs.

In the prior art, an IBM TDB, April 1990, page 262, provides a means for measuring ring latency of a token ring by timing total number of bytes in a message as a calculation of latency. This disclosure does not measure latency frequently enough to detect trends and allow action before a problem is apparent to a ring user.

U.S. Pat. No. 5,206,857 discloses a means for measuring the ring latency by using a counter to count the time the number of cycles for a node to receive its own packet which has traversed the entire ring. A clock is used to provide timing information so that the propagation delay or ring latency measurement can be measured by a master node with a clock. Again, the disclosure does not measure latency frequently enough to detect trends and allow action before a problem is apparent to a ring user.

U.S. Pat. No. 5,235,593 describes a timer for measuring the ring latency of a token ring at each node. The '593 patent does not do anything to measure minimum or maximum latency or the number of latency changes as a basis for determining ring latency caused problems and latency trends.

U.S. Pat. No. 5,313,466 discloses a method for real time message transmission in terms of latency in sending messages with settings on maximum transmission time. The '466 patent does not provide a mechanism for "jitter" control as a means of keeping the network in a stable condition.

U.S. Pat. No. 5,247,626 discloses a means for configuring an FDDI controller to accommodate a particular average bus latency and not the latency on a token ring.

IBM TDB, February 1994, pages 349–350 discloses measuring latency and bandwidth separately and independently of a communication link type.

U.S. Pat. No. 5,206,857 discloses a technique for distributing timing synchronization among the selected nodes and not the measurement of ring latency.

U.S. Pat. No. 4,663,748 discusses latency in terms of importance to traffic with respect to providing two ways of transmitting messages on a short cycle or a long cycle such that control can be exercised whether its a high priority or low priority traffic from the cycle period.

U.S. Pat. No. 5,309,428 discloses putting data on a ring and measuring with a clock the amount of time a frame transmits on the ring. The '428 patent does not utilize a token revolving naturally around the ring and the occurring frame transmissions for controlling latency.

None of the prior art measures latency on a ring without a clock. Nor does the prior art measure latency on a ring by counting bits between successive tokens or a token and the following frame to determine the amplitude and frequency of latency. Further, the prior art does not passively determine latency on the ring or have the ability to detect the insertion and removal of a station on the ring. The ability to passively measure latency on a ring without the use of clocks will advance the measurement and control of high speed data networks which are particularly sensitive to failure due to latency.

SUMMARY OF THE INVENTION

An object of the invention is a system and method for passively measuring ring latency on a token ring without the use of clocks.

Another object is a system and method for passively measuring the frequency and amplitude of ring latency by counting bits between successive tokens or a token and the following frame on the ring.

Another object is a system and method for passively measuring the total delay between any two tokens.

Another object is a system and method for detecting the insertion and removal of a station on a ring.

Another object is a system and method for detection of a passive device inserted or removed from a ring.

Another object is a system and a method for measuring the minimum and maximum number of bits between successive tokens, or a token and the following frame, and the number of changes in such bits as a basis for determining ring latency.

Another object is a system and method of generating a latency event vector indicative of ring latency in a measured-time interval.

Another object is a system and method for using a ring latency vector in controlling the timing of tokens on a network.

Still another object is a system and method of detecting and correcting latency trends.

These and other objects are accomplished in a ring environment including a plurality of stations and using standard token ring protocols (including FDDI). The token ring is subject to changes in the number of bits between successive tokens, the changes being due to changes in the electrical and operational characteristics of the network. Ring latency is determined for such changes by counting the minimum (Cmin) and maximum (Cmax) number of bits between successive tokens or between a token and the next frame, as a measurement of inter-token or token to frame spacing. The minimum and maximum spacing and the number of spacing changes (Li) in terms of bits on the line can be used during a measurement time interval (MTI) as an indicator of ring latency. Based upon the MTI, a latency control vector (Li) can be generated to indicate network performance. A monitoring station on the network responsive to the latency control vector adjusts the spacing between tokens by increasing or decreasing the speed of token generation through the addition or removal of delay between successive tokens by adding or withholding bits to the ring. Since counting of bits is a passive operation, the ring is not affected from a latency standpoint. The changes in the frequency and amplitude of the minimum and maximum number of bits between successive tokens is an indicator of the insertion or removal of a station on the ring. Likewise, such changes can determine the insertion or removal of a passive device on the ring.

In addition the vector (Li) can be changed to measure the minimum and maximum space between any two tokens (which will be effected by frame transmission activity) to adjust station traffic prioritization when necessary.

DESCRIPTION OF THE DRAWINGS

These and other objects, features and advantages will be more fully comprehended with reference to the accompanying figures.

DESCRIPTION OF PREFERRED EMBODIMENTS

Figure 1:
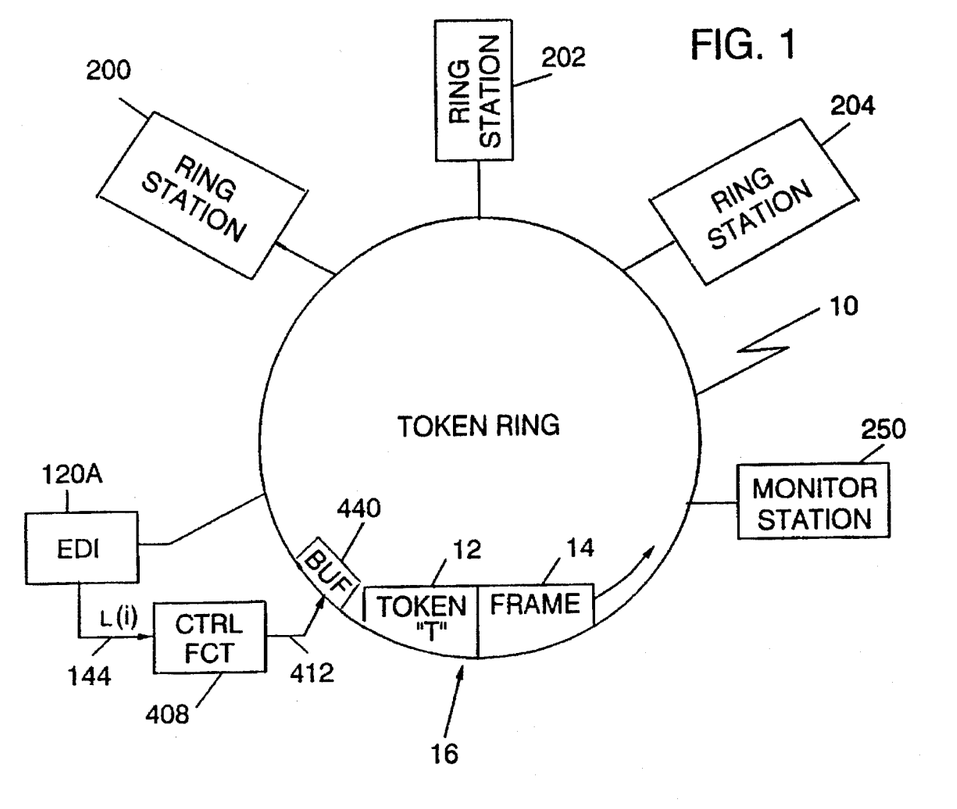
FIG. 1 is a representation of a token ring which implements the principles of the present invention.
Figure 4A:
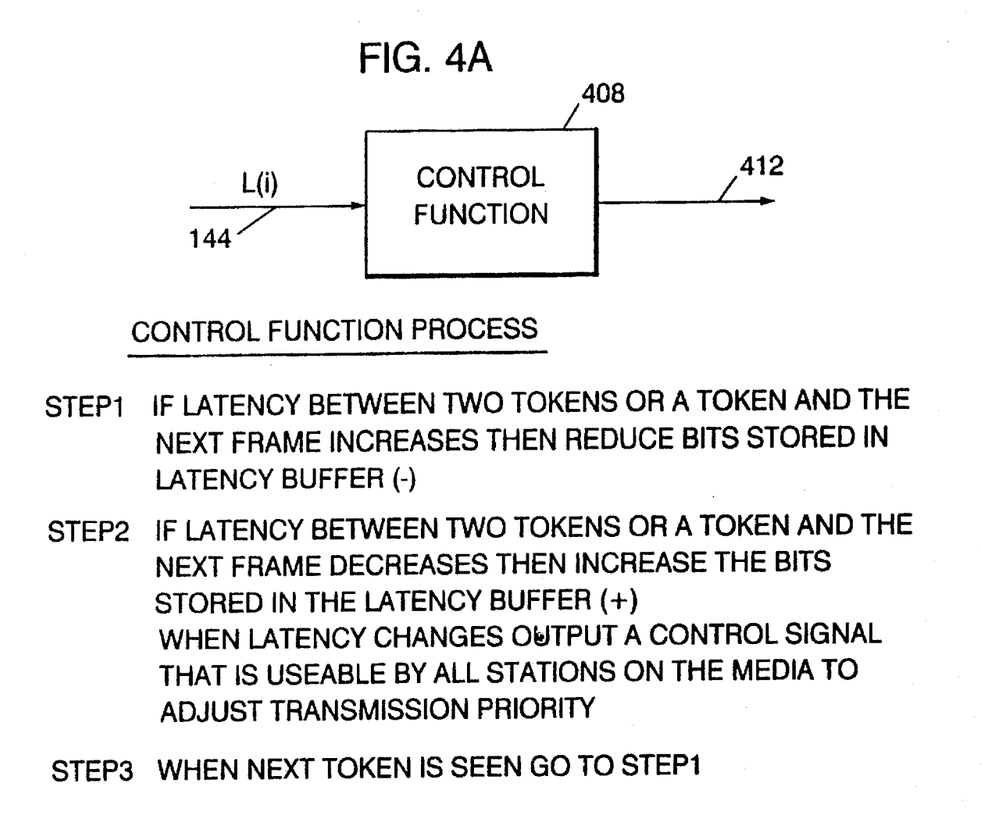
FIG. 4A is a block diagram of a control function coupled between the EDI of FIG. 3 and the token ring of FIG. 1.
Figure 4B:
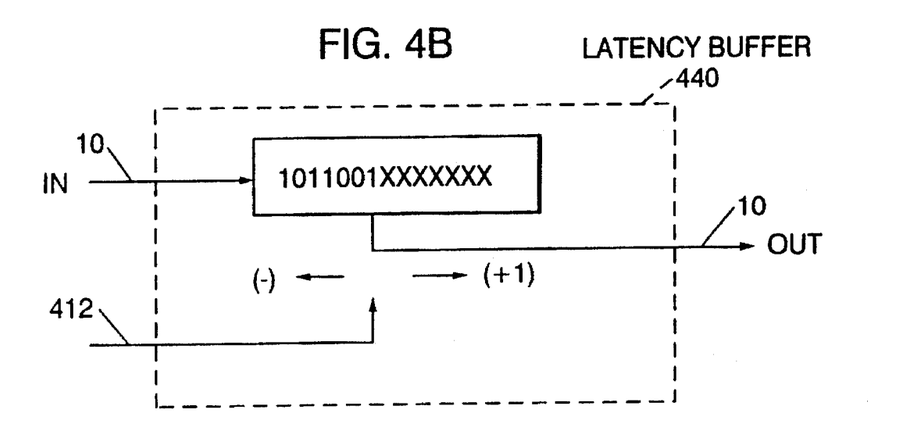
FIG. 4B, is a block diagram of a buffer coupled to the control function of FIG. 4A.

In FIG. 1, a token ring or FDDI ring 10 circulates a token 12, continuously among a plurality of ring stations 200, 202, 204; a monitor station 250 and a buffer 440 (to be described in conjunction with FIG. 4B). When a token passes by, the station recognizes the token and proceeds to capture the token after which the station is granted control of the ring for some specified time period during which it may transmit one or more frames 14, after which the token is released. Token rings and their operation are described in the prior art, as for example, U.S. Pat. No. 5,235,593 issued Aug. 10, 1993.

Figure 2:
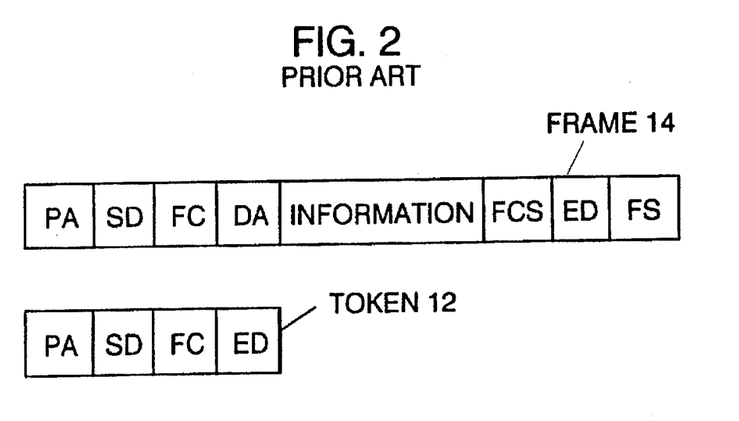
FIG. 2 is a representation of a prior art frame and token which may be used on the ring of FIG. 1.

In FIG. 2, the contents of a typical token 12 and frame 14 (for FDDI) are shown. The token 12 includes a series of fields including a preamble frame PA which consists of a sequence of idle line-state symbols which proceeds every transmission. The idle symbol provides a maximum frequency signal which is used for receive clock synchronization. A start delimiter field (SD) consists of a two control symbol stock delimiter pair which is uniquely recognizable independent of symbol boundaries. A control field (FC) defines the type of frame. With ring protocols, there is a bit in FC which uniquely distinguishes a token and is a basis for measuring latency in the present invention. An ending delimiter field (ED) usually completes a token. In the frame 14, a (DA) and an (FS) fields contain a destination and source addresses of any transmitted frame. The DA may be either an individual address or group address. A frame check sequence field (FCS) contains a cyclic redundancy check. The information field, as is the case for all fields covered by the FCS, consists of only of the data symbols.

Returning to FIG. 1, the FC field for FDDI or AC field for token ring include a bit 16 which when recognized by a station identifies an available token. Typically, the bit 16 is the fourth most significant bit in the AC field of a token on a token ring. The bit is used as a reference point in measuring the distance between the next successive token or the next frame following the token. The distances are an indication of the total delay around a ring.

Figure 3:
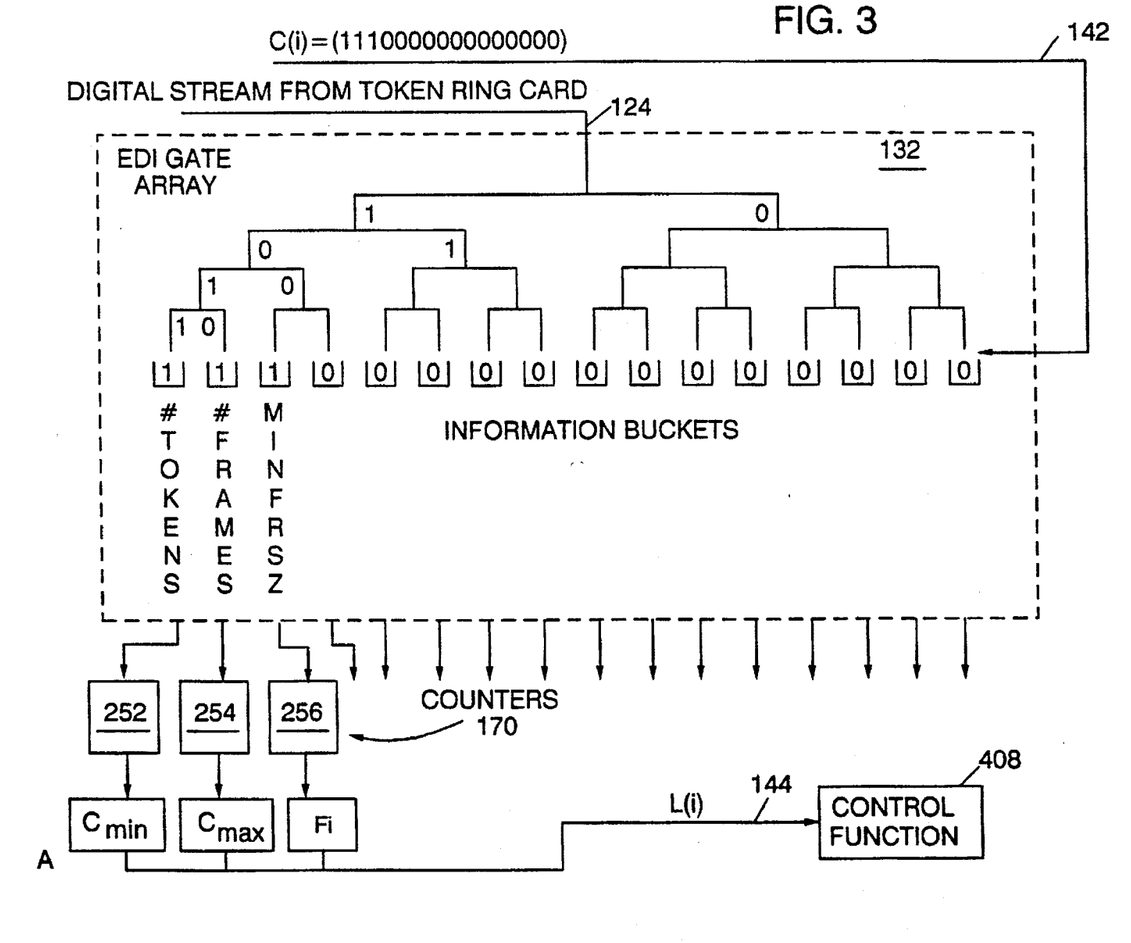
FIG. 3 is a representation of an Event Driven Interface (EDI) for measuring successive token spacing or successive token—frame spacing on the ring of FIG. 1.

In addition to the monitor station 250, the buffer 440, the ring is coupled through a control function 408 to an Event Driven Interface (EDI) 120A. The EDI is more fully described in U.S. Pat. No. 5,375,070 assigned to the same assignee as that of the present invention, which patent is incorporated herein in its entirety. Turning to FIG. 3, the EDI is shown in greater detail. Essentially, the EDI is a digital filter for recognizing the token bit 16 in each token and counting bits between successive tokens or a token and a succeeding frame. A series of counters 252, 254 and 256 included in the digital filter are used to count bits in the digital stream 124 from the token ring card, once the token bit 16 is recognized. The counter 252 indicates Cmin the minimum number of bits between successive tokens or between any token and its successive frame. The counter 254 indicates Cmax the maximum number of bits between successive tokens or the token and a successive frame. The counter 256 indicates Fi the frequency or the number of latency changes on the ring media. By measuring the frequency of changes in counter 256 and the amplitude of the changes in counters 252 and 254, a latency vector Li can be generated and applied to a control function 408 (or to any and all stations) coupled to the ring 10. An example of a control function is shown in FIGS. 4A and 4B.

In addition, the EDI can be reprogrammed to count the maximum and minimum number of bits between any two tokens. One or more stations transmitting frames will cause this count to fluctuate due to frame transmission activity. The number of changes can be accumulated as well. The additional information can be used, in accordance with the invention, to set station traffic prioritization high for important traffic if the distance between tokens becomes too large.

In addition, the control function can direct changes in the priority of certain classes of traffic on the ring. For example, video traffic could be assigned to a higher priority since video is very sensitive to latency changes. Another control action would be to send "death" frames out to individual stations on the media to terminate their operation until the source of the latency problem was established. Also, a message could be sent to an operator indicating a growing latency problem and for the operator to initiate problem determination or diagnostics.

Referring to FIGS. 4A and 4B, a latency vector L(i) is supplied as an output from the EDI on line 144 to the control function 408. The control function outputs one or more control signals 412 to the buffer. The function of the control function is to determine if latency has changed between two successive tokens or a token and a frame, then to send a signal or signals to the latency buffer shown in FIG. 4B. The latency difference between successive measurement time intervals can be measured by any prior art comparator or logic circuitry. If ring latency changes, the buffer 440 inserted on the media or ring can control the latency appearance as a fixed value to all the stations which are on the ring. The latency buffer 440 receives data from the ring 10 and the signal 412, the latter adjusting the amount of buffer in use at that particular time to compensate for latency changes. The control function described in FIG. 4A also provides a step 3. When latency changes, there is the option for control signal to be sent over the media or a control frame can be sent over the media so that all stations on the media can adjust transmission of their traffic, according to whether latency has increased or decreased dramatically on the media. The changes in the number of bits seen between the token and between tokens and frames are adjusted by the latency buffer 440 to keep the token spacing constant and therefore the delays that are seen on the media by the stations attached to the media. The adjusting function of the latency buffer reduces jitter and prevents interference to timing of sensitive traffic flows.

TABLE 1

ICS Sample Report generated on Mon Oct 17 15:30:31 1994
Bank Ring002 60-second intervals (15 devices)

|   | (1) Time | (2) CMIN | (3) CMAX | (4) Fi | (5) #T | (6) #F | (7) #FB |
|---|---|---|---|---|---|---|---|
|   | 14:37:38 | 154 | 164 | 31027 | 5695344 | 64125 | 9524525 |
| a)→ | 14:38:38 | 154 | 164 | 30797 | 5709800 | 63739 | 9246333 |
| b)→ | 14:39:38 | 154 | 171 | 31961 | 5698688 | 66169 | 9447011 |
|   | 14:40:38 | 154 | 172 | 31317 | 5726110 | 64839 | 8927730 |
|   | 14:41:38 | 154 | 171 | 31673 | 5699766 | 65768 | 9429014 |
| c)→ | 14:42:38 | 154 | 172 | 28822 | 5753577 | 59292 | 8434750 |
| d)→ | 14:43:38 | 154 | 164 | 31315 | 5713180 | 64848 | 9179279 |
|   | 14:44:38 | 154 | 164 | 29968 | 5733221 | 62085 | 8807505 |
|   | 14:45:38 | 154 | 164 | 31439 | 5727095 | 64214 | 8912988 |
|   | 14:46:38 | 154 | 164 | 30714 | 5734168 | 63340 | 8782112 |
|   | 14:47:38 | 154 | 164 | 30090 | 5745533 | 61859 | 8574217 |
|   | 14:48:38 | 154 | 173 | 34080 | 5625475 | 70344 | 10832574 |
|   | 14:49:38 | 154 | 173 | 38026 | 5581811 | 79184 | 11610970 |
|   | 14:50:38 | 154 | 164 | 34030 | 5695403 | 70355 | 9481875 |
|   | 14:51:38 | 154 | 164 | 30950 | 5723730 | 64062 | 8977218 |
|   | 14:52:38 | 154 | 171 | 29724 | 5733870 | 61471 | 8801154 |
|   | 14:53:38 | 154 | 164 | 32757 | 5695964 | 67460 | 9493358 |
|   | 14:54:38 | 154 | 172 | 29973 | 5710488 | 62306 | 9245520 |
|   | 14:55:38 | 154 | 164 | 31139 | 5715644 | 64509 | 9135116 |
|   | 14:56:38 | 154 | 164 | 31081 | 5708961 | 64248 | 9265453 |
|   | 14:57:38 | 154 | 171 | 31330 | 5687914 | 64533 | 9669024 |
|   | 14:58:38 | 154 | 172 | 30487 | 5711437 | 63086 | 9223429 |
|   | 14:59:38 | 154 | 171 | 31916 | 5695996 | 65954 | 9503629 |

Referring to Table 1 and FIG. 3, a sequence of time periods is shown, each time period definitive of a latency control vector (Li). Each latency control vector is an output of counters 252, 254 and 256. The counters are outputted each time period or measurement time interval (MTI).

Column 1 in Table 1 is the MTI, in this case one minute.

Column 2 is Cmin, the minimum latency value field detected on the ring in the MTI by the output of counter 252 shown in FIG. 3.

Column 3 is Cmax, the maximum latency count measured on the ring as the output of counter 254.

Column 4 is Fi, the number of latency changes which is the output of counter 256.

Other counters shown in the Table 1 but not described here, include for example, the fifth column which indicates the number of times a token circulated the ring, the sixth column indicates the number of frames transmitted, the seventh column indicates the number of frame bytes.

The outputs of counters 252, 254 and 256 form a latency vector L(i) for the MTI which vector is sent to the control function 408 for latency control purposes.

Table 1 shows the actual statistics for a token ring having fifteen devices with measurement time interval (MTI) of 60 seconds or one minute. Row a initiates a time interval at 14:37:38 in column 1. For this one minute period ending at 14:38:38, the minimum latency count on the ring or Cmin in column 2, row A was as low as 154 bits. The maximum latency count on the ring or Cmax in column 3, Row a was as high as 164 bits. The latency counter 256 is in column 4. This counter shows a value of 30,797 which means latency changed on the ring 30,797 times during the previous sixty second interval. The number of times latency was measured can be shown by looking at the number of tokens or 5,709,800, shown in column 5, Row a and the number of frames or 63,739 shown in column 6, row a. The number of frame bytes is 9,246,333. If the number of frames is subtracted from the token count, the minimum number of intervals in which latency was measured is well over 5½ million times. Each time the latency value of the ring was checked, only 30,797 times was a change identified and the change was no greater than an extra 10 bits of delay.

If values increase in the fourth column, Fi, then a jitter problem is indicated as taking place in the ring due to the various changes in the apparent delays for traffic transmitted on the ring. For example, the fourth column which shows the number of latency changes, can be viewed as a frequency of latency changes. The columns CMIN and CMAX which have the minimum latency and the maximum latency, can be viewed as the amplitude of the latency. If the amplitude, which is the difference between the min and max values is very large, and the number of changes is very large, experience indicates a thrashing environment on the line and latency is likely to be a problem to timing sensitive processes, particularly isochronous traffic flows, such as full motion video. Such a line condition can cause distortion and poor quality of the image on the video screen utilizing the particular media.

Turning to Row b in Table 1 at MTI 14:39:38, notice the maximum latency value changes from a count of 164 to 171. A jump in amplitude usually indicates a synchronization problem for one or more stations attached to the media. In Table 1, the problem existed for four minutes and thereafter stops. The difference at Row c, which is 14:42:38 and Row d, which is 14:43:38, indicates the maximum latency value changes again from 172 down to 164 indicating the synchronization problem ceased.

Experience indicates that when the number of latency changes is greater than 100,000 for each million tokens circulated, "jitter" can become a problem on the ring. In the examples in Table 1, the difference between CMAX-CMIN is large enough and the magnitude of Fi is large enough for a warning message to be issued to an operator that jitter is beginning.

Notice throughout Table 1 that the minimum latency is 154 which is an indication of the cable length and the number of attached stations. The maximum latency show variations due to the fact that timing problems could be occurring in the synchronization of the individual stations in the ring. When new stations join the ring and drop off the ring at certain periods of time, the CMIN value will jump or decrease due to the increase in latency that any active or passive station introduces to the ring.

The rows in Table 1 form a series of latency control vectors. Each vector is formed from the statistical information collected from on the ring by doing pattern matching with the EDI 120A shown in FIGS. 1 and 3. The EDI collects the information regarding the amplitude of latency and the number of latency changes. Stated another way, the counters 252, 254 and 256 in FIG. 3, accumulate the information in a passive fashion, that is to say, the data is collected without disturbing the timing of the ring in any way or using any clocks.

By using latency information the detection of passive devices attached to the ring can be determined. A passive device means a device attached to the ring solely to listen and not participate in the token ring protocol operation. In most ring protocol operation devices attached to the ring, announce their presence through a series of frames and control information passed between the station, its neighbors and a monitoring station. In addition, each device attached to a ring participates in a ring poll every seven seconds which indicates the presence of the attaching device to the other stations or devices. Some devices attach to the ring such as LAN analyzers, as well as intruder devices, solely to listen to the traffic that is taking place on the ring. When a device attaches to the ring, it is impossible not to disturb the latency of the ring, as shown in Table 2.

TABLE 2

ICA Sample Report generated on Mon July 25 13:40:53 1994 Test Ring 1-second intervals (16 devices)

| | Time | CMIN | CMAX | Fi | #T | #F | #FB |
|---|---|---|---|---|---|---|---|
| | 13:39.33 | 120 | 121 | 42 | 130755 | 90 | 7230 |
| a)→ | 13:39.34 | 120 | 121 | 22 | 131038 | 33 | 3240 |
| b)→ | 13:39.35 | 115 | 121 | 39 | 115166 | 73 | 5958 |
| | 13.39.36 | 115 | 116 | 45 | 136459 | 95 | 6588 |
| | 13:39.37 | 115 | 116 | 23 | 136646 | 53 | 4195 |
| | 13:39.38 | 115 | 116 | 31 | 136533 | 61 | 5729 |
| | 13:39:39 | 115 | 116 | 15 | 136725 | 39 | 3126 |
| | 13:39:40 | 115 | 116 | 46 | 136519 | 79 | 5807 |
| | 13:39:41 | 115 | 116 | 28 | 136632 | 52 | 4227 |
| | . | | | | | | |
| | 13:40:18 | 115 | 116 | 33 | 136568 | 73 | 5120 |
| | 13:40:19 | 115 | 116 | 35 | 130889 | 67 | 4258 |
| | 13:40:20 | 115 | 116 | 30 | 136607 | 59 | 4696 |
| | 13:40:21 | 115 | 116 | 37 | 136513 | 72 | 5917 |
| | 13:40:22 | 115 | 116 | 24 | 136653 | 46 | 4080 |
| c)→ | 13:40:23 | 115 | 121 | 43 | 133932 | 76 | 6319 |
| d)→ | 13:40:24 | 120 | 121 | 38 | 130788 | 78 | 6651 |
| | 13:40:25 | 120 | 121 | 51 | 130852 | 85 | 5949 |
| | 13:40:26 | 120 | 121 | 39 | 130812 | 85 | 6366 |
| | 13:40:27 | 120 | 121 | 11 | 131146 | 18 | 1789 |

Table 2 is the same as Table 1 except it is for a different ring and the measurement time interval in Table 2 is on a per-second basis, whereas Table 1 measurement time interval is on a per-minute basis. Since the MTI is smaller then the values are smaller in Table 2 than in Table 1. Considering Table 2, an example of a station joining the ring and a station leaving the ring are shown. In line a, the CMIN field shows 120 and the CMAX field shows 121 indicating an amplitude variation of timing in the ring of one bit during that one second interval time. Line a) indicates an Fi of 22 which indicates 22 changes occurred in latency on the ring between 131,038 tokens. Line b) which is at time 13:39:35, shows a decrease in the CMIN value from 120 to 115. CMIN represents the minimum latency observed on the ring. The minimum latency is the function of the physical characteristics of the ring which is cable length and the number of stations attached. Only two things can cause this. Either the cable length has been altered dynamically on the fly to a shorter value or a station has been attached. A cable length cannot be altered on the fly to a smaller length without bringing down the ring. In this particular case, the only basis that can cause a decrease is a station has left the ring.

In the second group of data at line c), CMIN is 115, CMAX is 121 while at line d) CMIN is 120 and CMAX is 121. During the second from 13:40:23 to 13:40:24, a station has joined the ring. If the CMIN value changes by at least 2, experiences indicates a station has joined the ring. Whether the station is an active station or a passive station can be determined by whether or not the station participates in the ring poll sequence that occurs every seven seconds. Attaching any number of existing LAN software or hardware analyzer to the media, will give information about the poll sequence on the ring. Basically, if the station attaches to the ring and a change of CMIN occurs which is greater than 2, experience indicates a new station has attached to the ring. The ring should also subsequently indicate within the next seven seconds a ring poll sequence in which that new station identifies its presence on the ring. When that occurs, there is a clear indication that an active station has come onto the ring.

If CMIN goes up, as shown in lines c) and d) in Table 2 and there is no change in the ring poll sequence, then an indication is given that a passive or intruder device has attached to the ring. Thus the invention can detect security problems.

The present invention also indicates when a passive device attaches to the ring because latency changes will take place and will indicate that some device has now become active on the ring. Regardless of whether the device chooses or not to become part of the media protocol, the present invention will be able to detect its presence. Both Table 1 and Table 2 give indications of the jitter on the media. One way to detect whether the jitter is becoming a problem and to be able to track it is to have a sequence of tests that determines whether or not jitter is building on the ring and the severity of the jitter. Shown below are examples of jitter tests to help identify whether jitter on the media is becoming a problem or exists as a severe problem currently in the data observed.

JITTER TESTS (1) If CMAX−CMIN≦2 And Fi<0.01 * (#T−#F) Then Ideal State (2) If 6≧CMAX−CMIN>2 and Fi<0.001 * (#T−#F) Then Warning State (3) If 28≧CMAX−CMIN>6 and Fi<0.1 * (#T−#F) Then Mild Jitter Detected (4) If 56≧CMAX−CMIN>28 and Fi>0.1 * (#T−#F) Then Jitter Detected (5) If MAXL–MINL>56 or Fi>0.2 * #T Then Severe Jitter Detected Equation 1 shows a test to determine if the difference between MIN and MAX is ≦ or = to 2 and the total number of latency changes Fi is less than one percent of the number of tokens minus the number of frames, experience indicates an ideal state for a high speed data communications line. For example, considering Table 2, the difference between MIN and MAX, except for line b) and line c) is always within one. The reason difference is larger at line b) and line c) is because there was a change to the media by the insertion or the drop off of a station on the media. This test indicates if there is very little change in the difference between MIN and MAX and the frequency of changes is small compared to the number of tokens, and an ideal state exists on the line.

Equation 2 shows the variation in MIN and MAX to be greater than 2 but ≦6. Six is the standard value for the amount of bit buffering typically provided in monitor stations 250 (see FIG. 1) for elastic buffering. Such buffering prevents bits from being lost due to delay variations on the media. In this range and where the Fi value is less then one percent of the tokens minus the number of frames, the line is entering a warning state which says that jitter is beginning on the media and should be watched but its within the tolerance of the media to deal with the jitter as it exists. Table 1 shows the data fits within the jitter test set forth in equation 2.

Equation 3 show the jitter is greater then 6 but ≦ to 28 and the frequency is greater then 10 percent of the tokens minus the number of frames. In this condition, experience indicates mild jitter has occurred on the line. This jitter condition is within the tolerance of many IBM adapter cards which supply a 56-bit elastic buffer, 28 is half of that elastic buffer and indicates a delay variances ±28 bits is available. Any more than 28 bits causes a ring failure.

Equation 4 shows a change in CMIN and CMAX of more than 28 bits is significant and more than likely beyond the ability of the stations on the media to tolerate the jitters. If this is occurring >than 10 percent of the total token count, minus the number of frames, a jitter condition exists on the line.

Finally equation 5 indicates, if either the MAX and MIN difference is greater then 56 or the frequency is greater then 20 percent of the tokens, a severe jitter detection problem on the media.

Figure 5:
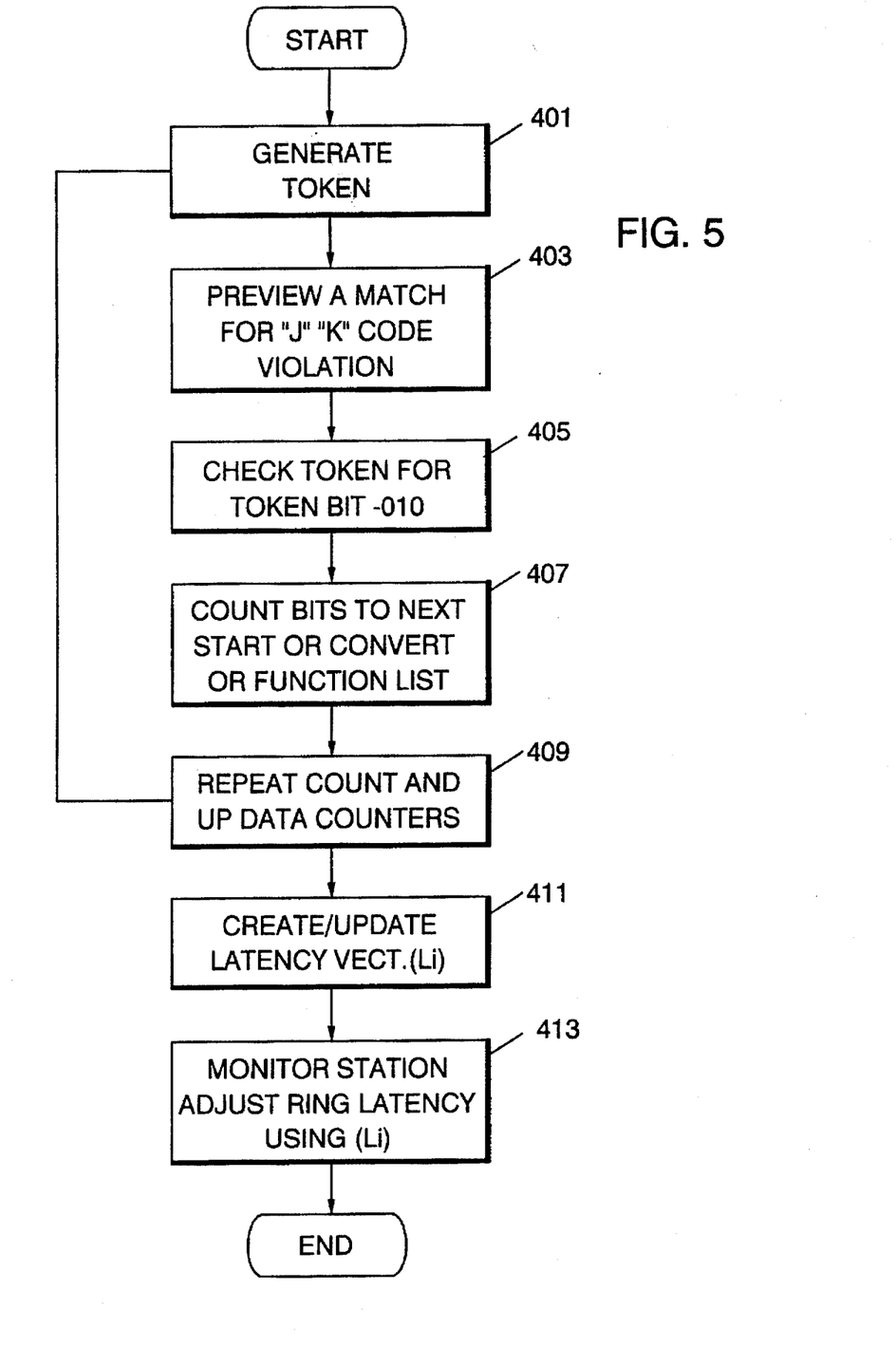
FIG. 5 is a flow diagram of a process implementing the present invention.

FIG. 5 shows a process implementing the invention. In step 401, a token is initiated on the ring 110 by a monitor station 250. In a step 403, pattern matching is performed at the EDI for identifying "J", "K" code violations. The token bit 16 (see FIG. 1) is identified by the EDI in a step 405. In step 407, the EDI initiates a bit counting process on the media until the next token is captured and the next token bit 16 or the next frame is identified. The counting operation distributes the bit counts in the measurement time interval into the Cmin or minimum counter 252 or Cmax or maximum counter 254. Cmin and Cmax indicate the amplitude (A) of the latency changes for the measurement time intervals. If the count changes between successive tokens or a token and the next frame, the latency counter 256 is increased to provide an indication of the frequency (Fi) of latency changes on the ring. The results of the Cmin, Cmax and (Fi) generate L(i) a latency vector indicative of ring latency. An operation 409 repeats steps 401–407 to form and update a latency vector in an operation 411. The latency vector L(i) is supplied as an input to the control function in an operation 413. The control function can provide an input to the buffer or the monitor station which adjusts the latency on the ring in accordance with the latency vector by adding or delaying the addition of bits on the ring to keep the amplitude of latency changes bounded and the number of latency changes small.

Although a specific embodiment of the invention has been disclosed, it will be understood by those having skill in the art that changes can be made to the specific embodiment without departing from the spirit and scope of the invention.

We claim:

1. In a token ring including a plurality of stations using a token ring protocol, the token ring subject to pattern timing changes due to changes in the electrical characteristics and the number of stations on the ring, a system for measuring and correcting ring latency comprising:

means coupled to the token ring for generating bits and token frames in a defined pattern according to the token ring protocol;

passive digital filter means coupled to the token ring for measuring CMIN, the minimum spacing, CMAX, the maximum spacing in bits between tokens and calculating Fi the frequency of changes in the spacing in bits between successive tokens or a token and a frame on the ring;

means generating a latency event vector Li; and bits to the token ring to achieve a constant ring latency regardless of electrical or operational changes on the token ring.

2. The system of claim 1 further including means for identifying a bit in the token indicating a valid token on the ring.

3. The system of claim 2 for determining jitter on the ring when Cmax minus Cmin is greater than 56 bits between successive tokens or a token and a frame on the ring.

4. The system of claim 3 wherein the means responsive to the latency vector increases or delays the addition of bits to the ring to achieve a constant ring latency.

5. The system of claim 4 further including a buffer responsive to a control function for controlling latency on the ring.

6. The system of claim 5 further wherein the means for counting Cmin, the minimum spacing and Cmax, the maximum spacing in bits between successive tokens or a token and a frame is an event driven interface.

7. The system of claim 6 wherein the latency on the ring is passively measured.

8. The system of claim 7 wherein the insertion or removal of an active or passive device on the ring is detected from the measurements made by the passive digital filter means.

9. In a token ring including a plurality of stations using a token ring protocol, the token ring subject to changes in timing pattern due to changes in electrical or operational characteristics of the ring, a method for measuring and correcting ring latency comprising the steps of:

generating a token on the ring;

pattern matching for "j", "k" token ring code violations as a starting delimiter on the ring;

checking the token for a token bit to indicate a token is active and available for pattern matching;

counting bits on the ring until the next starting delimiter and token bits or next starting delimiter and frame bits in a measurement time interval (MTI);

calculating average ring latency after determining station delay and line delay on the ring plus interframe gap times token count plus frame count divided by the measurement time interval; and generating a latency vector for utilization by a control device coupled to the token ring, the control device correcting the ring latency to a defined condition on the ring.

10. The method of claim 9 further comprising the step of determining the frequency and amplitude of latency on the ring.

11. The method of claim 10 further comprising the step of determining Cmin, Cmax and L(i) from the counting of bits on the ring.

12. The method of claim 11 further comprising the step of determining the insertion or removal of an active or passive device on the ring.

13. The method of claim 12 wherein ring latency is passively measured on the ring.

14. An article of manufacture comprising:

a computer usable medium having computer readable program code means embodied therein for measuring and correcting ring latency in a token ring including a plurality of stations using a token ring protocol, the token ring subject to changes in timing pattern due to changes in electrical or operational characteristics of the ring, the computer readable program code means in said article of manufacture comprising:

computer readable program code means for generating a token on the ring;

computer readable program code means for pattern matching for "j", "k" token ring code violations as a starting delimiter on the ring;

computer readable program code means for checking the token for a token bit to indicate a token is active and available for pattern matching;

computer readable program code means for counting bits on the ring until the next starting delimiter and token bits or next starting delimiter and frame bits in a measurement time interval (MTI);

computer readable program code means for calculating average ring latency after determining station delay and line delay on the ring plus interframe gap times token count plus frame count divided by the measurement time interval; and computer readable program code means for generating a latency vector for utilization by a control device coupled to the token ring, the control device correcting the ring latency to a defined condition on the ring by adding or delaying the addition of bits to the ring.

* * * * *